Dec. 4, 1962 D. B. SEAGER 3,066,891
AIRCRAFT UTILIZING JET AUGMENTED THRUST FOR VTOL
Filed Aug. 14, 1959 3 Sheets-Sheet 1

*INVENTOR.*
DONALD B. SEAGER
BY
George C. Sullivan
Agent

Dec. 4, 1962  D. B. SEAGER  3,066,891
AIRCRAFT UTILIZING JET AUGMENTED THRUST FOR VTOL
Filed Aug. 14, 1959  3 Sheets-Sheet 2
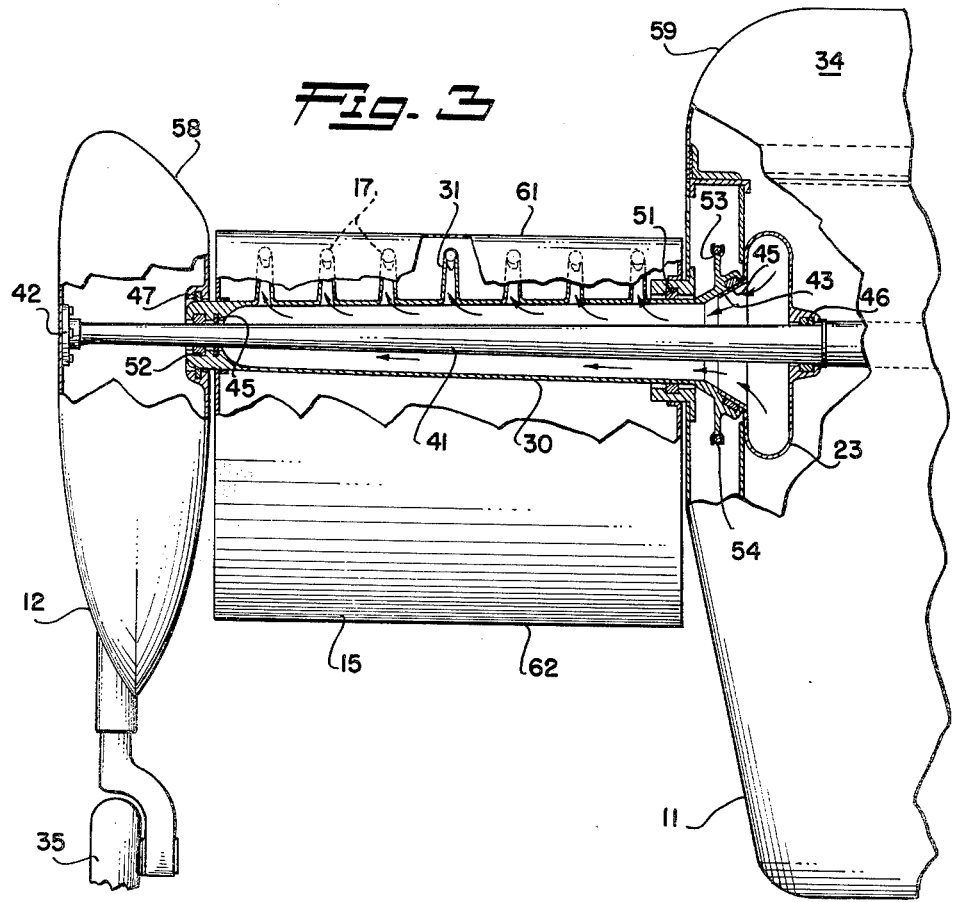
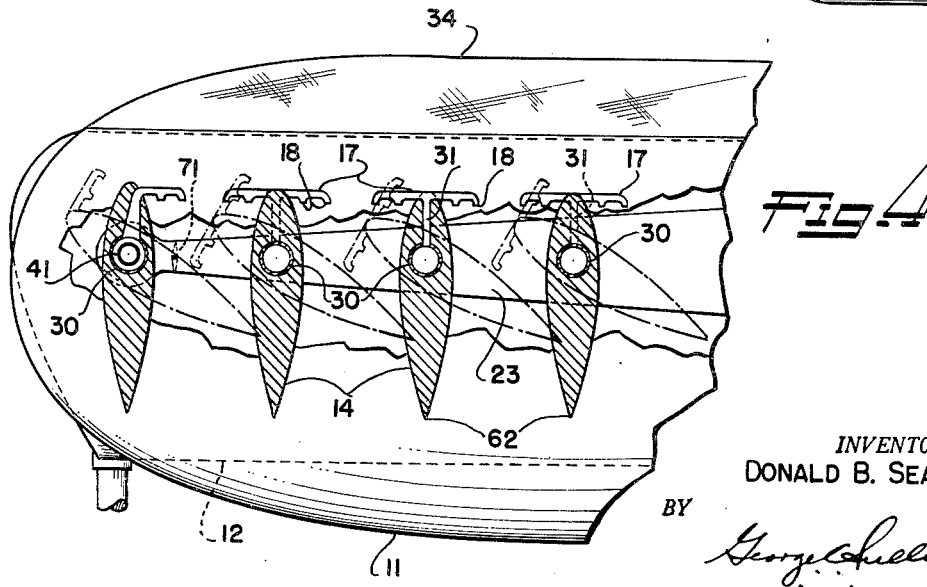
INVENTOR.
DONALD B. SEAGER
BY
Agent

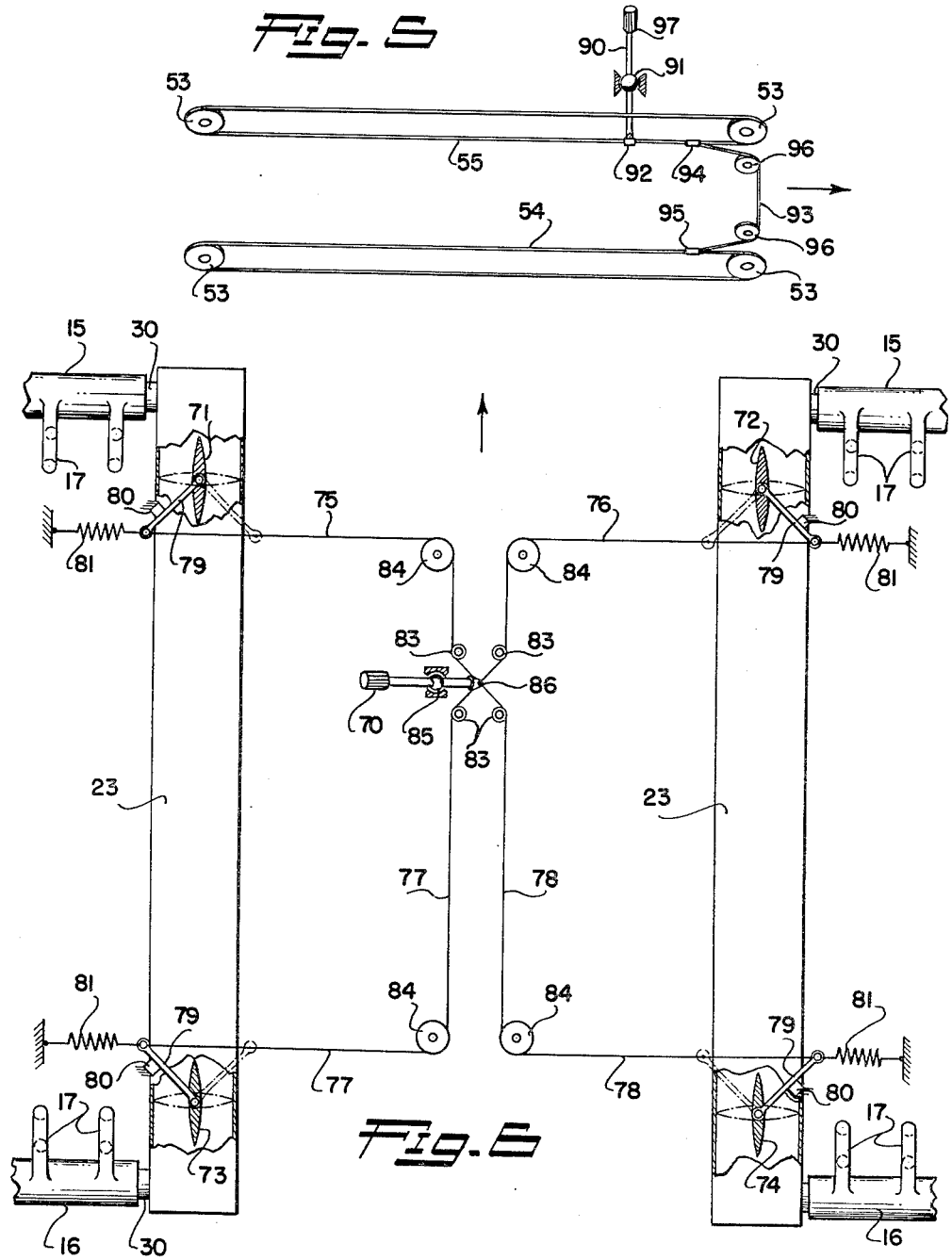

United States Patent Office 3,066,891
Patented Dec. 4, 1962

3,066,891
AIRCRAFT UTILIZING JET AUGMENTED
THRUST FOR VTOL
Donald B. Seager, Burbank, Calif., assignor to Lockheed
Aircraft Corporation, Burbank, Calif.
Filed Aug. 14, 1959, Ser. No. 833,811
7 Claims. (Cl. 244—23)

This invention relates to an aircraft. More particularly, it relates to an aircraft which utilizes the jet augmentation of exhaust principle. More particularly, it relates to an aircraft which adapts itself to small design and has vertical takeoff and landing abilities.

Ideal requirements on aircraft of this type include vertical takeoff and landing ability, short takeoff and landing ability, good hovering characteristics, good stability in all phases of flight, simple controls, easy maintenance and good safety characteristics.

Previous efforts to develop an aircraft of small configuration have largely involved the use of propellers or rotors which are mounted vertically to provide downward thrust for vertical and hovering operations. This vertical mounting of rotors presents great problems for the transition from vertical to forward flight. Normal cruise efficiency is sacrificed for vertical takeoff ability. It all but eliminates short takeoffs which are required when excessive loads are carried.

A major problem with the rotor-type aircraft is its lack of static stability. There is an inherent controlability problem which can only be overcome by means of a complicated control mechanism. With an increase in complexity, there is a multiplied maintenance problem.

An example of the complicated control mechanism necessary for a vertically mounted rotor-type aircraft is the cyclic control of the rotor blades similar to that required in a helicopter. Like the mechanism required for rotor control in a helicopter, any elements for a rotor aircraft must be precision made and well balanced because of the vibration problem. The requirement for increased precision means greater cost and maintenance problems. The maintenance problem is especially critical when the aircraft is used in the field at a distance from maintenance bases.

An especially critical phase of the stability control problem in rotor-type aircraft is that of pitch and roll stability. When an unshrouded rotor is used, the angle at which relatively moving air meets the rearward portion of the rotor disk is greater than that at the forward part due to the slight downward movement of air at the forward part with resultant decreased pressures following, causing the air flow to curve sharply toward the rearward portion. This results in greater lift at the forward part causing pitch up. In addition, the downwash on the rear portion of the rotor disk caused by the forward part of the rotor disk reduces the thrust of the rearward portion of the disk and adds to the nose-up pitching moment. Some efforts to correct this problem have involved the provision of a shroud or duct around the rotor. For a shrouded rotor, the downward flow is deflected through the duct at a larger angle, leaving it substantially parallel to the propeller shaft axis. This results in a larger drag than that of the unshrouded propeller during forward flight and materially restricts maximum speed. When there is a cross flow across the shroud of the propeller as may be experienced during hover, there is an increase in flow over the leading tip of the shroud and a decrease over the rearward portion, causing uneven pressure distribution and unsymmetrical thrust distribution. These are additive and result in a nose-up pitching moment larger than that for the unshrouded rotor propeller. In the case of tandem configuration, that is one rotor in front of the other, the pitch would be aggravated since the downwash of the leading rotor on the rear unit would decrease the latter's thrust.

Roll stability about the longitudinal axis of the aircraft is most difficult when vertical rotors or propellers are used. When it is desired to cause or correct movement about the longitudinal axis, it can be seen that the rotor blade must change its angle of pitch twice for every 360 degrees of its travel in order that it create a greater lift on one side of the craft than the other. Artificial damping has been attempted but any success in this direction is met by multiplied problems due to increased complexity. Some efforts have been made utilizing four propellers located in tandem and side-by-side to overcome the roll problem. This sacrifices size without appreciably overcoming the roll problem.

Some attempts have been made in an effort to minimize the stability problem both in the roll and the pitch axes by using turning vanes about the rotors to control the direction of the air. Several sets of vanes are required. A typical arrangement involves yaw control vanes beneath the rotors mounted longitudinally with laterally mounted pitch control vanes above the rotors and roll control vanes longitudinally mounted below the yaw control vanes. To minimize the pitch-up action of the front rotor on the rear rotor of a tandem rotor aircraft, additional sets of laterally mounted vanes below the yaw control vanes are required. The position of these vanes must change considerably from one phase of flight to the next. The control system for these changes is thus quite complicated resulting in increased cost and maintenance problems.

Another effort involves the use of coaxial ducts for optimum fairing. The problem of cyclic control of the propeller blades is not, however, overcome by the use of co-axial ducts.

It is an important object of this invention to provide an aircraft which has vertical takeoff and landing ability, short takeoff and landing ability, good hovering characteristics and stability at all speeds, simple controls, easy maintenance, good safety characteristics and is designed so that small configuration may be constructed.

It is an object of the present invention to provide an aircraft which eliminates the problems resulting from use of rotors to produce thrust. A compressor provides pressurized air which is jetted aft and mixed with ambient air about airfoil-shaped vanes for augmented lift.

It is an important object of this invention to provide a flying platform type of aircraft which minimizes maintenance problems. The use of a compressor to pressurize cool air eliminates the need for hot air ducting and provides for less deterioration of parts.

It is a further object of this invention to provide an aircraft which has good stability characteristics. The secondary air from the compressor is ducted to nozzles at the leading edge of vanes and there jetted over the surface of the airfoil so that the center of lift does not shift appreciably from vertical to horizontal flight. Air flow is equal over all vanes.

It is further an object of this invention to provide an aircraft which has good vertical takeoff and horizontal flight abilities with smooth transition characteristics from the vertical to the horizontal flight attitude. Multiple airfoils are provided, mounted on lateral parallel axes for rotation from vertical for takeoff toward horizontal for normal forward flight. This transition is achieved by substantial simultaneous rotation of all airfoil shaped vane elements about their respective axes. This adjustability of the airfoil vanes makes it possible to directly oppose drag in all flight attitudes.

It is a further object of this invention to provide an aircraft which may achieve short takeoff and landing.

Because of the adjustability of the vanes, short takeoffs and landings may be achieved at weights above that possible for vertical takeoff and landing. The vanes are adjusted so that the leading edges are forward so that forward speed may be obtained in the takeoff run, thereby increasing the lift.

Additional advantages and objects will become apparent from a reading of the following detailed description, especially when taken in conjunction with the accompanying drawings wherein like numbers indicate like elements.

FIG. 3 is a view taken on lines 3—3 of FIGS. 1 and 2 showing in detail the duct system for the forward vane or airfoil.

FIG. 4 is a view similar to FIG. 2 partly broken away with the position of the airfoils shown in dotted lines for horizontal flight.

FIG. 5 shows a simplified diagram of the controls for pitch of the airfoils.

FIG. 6 shows a simplified diagram of the control system typical on an aircraft utilizing the principle of the invention disclosed herein.

Figure 1:
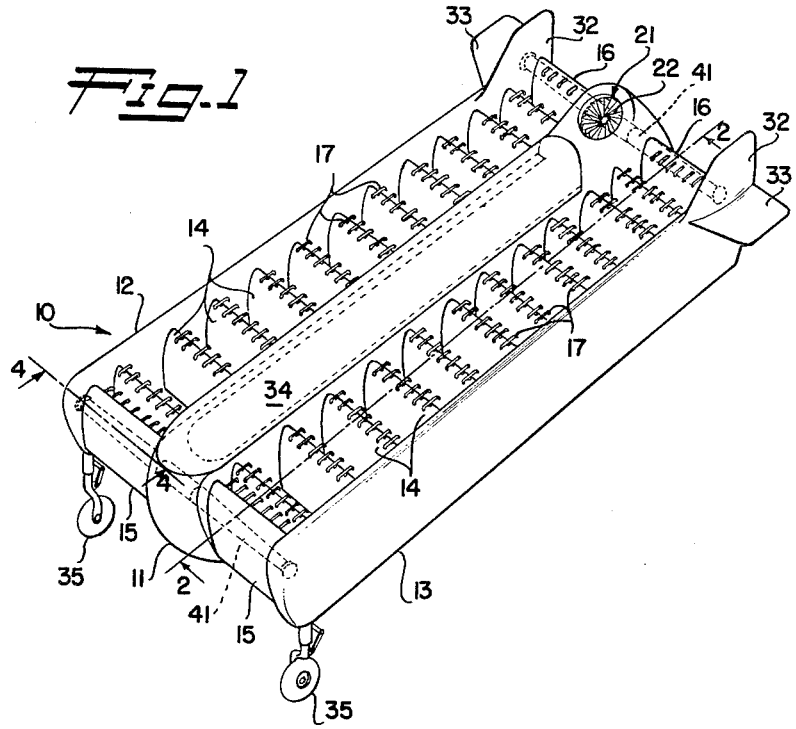
FIG. 1 is a perspective view of a flying platform type aircraft utilizing the principle according to the present invention.

The aircraft according to the present invention uses a thrust augmentation principle by which thrust as compared to that of a conventional jet aircraft where turbine engine exhaust gases are directed aft to provide thrust is increased in the neighborhood of sixty to eighty percent. This principle operates on the theory that the larger the mass of air that can be moved, the greater the resultant thrust. A jet of air in free space will tend to move the ambient air about it, causing a greater mass flow. However, this is very inefficient and precisely-designed aerodynamic surfaces and shapes must be used to cause greater movement of a greater mass of air. The present invention provides a passage for air at the entrance of which are many nozzles through which pressurized air is jetted. Proceeding in the direction of air flow, the passage rapidly decreases and then gradually increases in its cross-sectional area. This configuration tends to take the shape of a venturi tube. Jetted air being expelled at the entrance of this passageway will be at relatively high velocity. It will retain most of this velocity as it passes between the narrower part of the passage toward its front. There will be decreased pressures in this area in relation to the pressures of the other parts of the passage. This decreased pressure tends to suck air from behind and above the nozzle into the passageway. As the passage gradually opens and enlarges, the air will begin to pile up and the velocity will be decreased. However, a greater mass of air has been moved and while the thrust measurement, that is mass times velocity, has increased and the velocity decreased, the mass has increased at a greater rate than the velocity has decreased resulting in greater thrust. The negative pressures at the entrance to the passage tend to create a lifting or pulling force on the surfaces at the entrance end of the passage which is a desirable by-product. Another advantageous result is that, while the velocity is high around the jet nozzles at the entrance to the passage, the greatly increased mass of air absorbs the high velocity so that the entire mass takes on a uniform speed. During vertical takeoff when air flow is directed downardly, this means that there will be less ground erosion and less danger to personnel and property below than with other types of vertical takeoff aircraft.

To utilize the jet augmentation principle, the present invention provides a series of airfoil-shaped vanes which are mounted between perpendicular bodies for substantially simultaneous rotation about axes fixed in relation to each other so that they may be placed in the vertical position for vertical takeoff and rotated to form a cascade for horizontal flight. Each vane has a leading and trailing edge. The necessary thrust is provided by jetting pressurized air from nozzles along the leading edge toward the trailing edge of the vane. This creates a jet pump moving ambient air over the upper surfaces of the aircraft to produce negative pressure to aid lift. Substantially simultaneous rotation of these vanes from vertical to the cascade position is effected gradually, resulting in smooth transition from vertical to horizontal flight. Because the propelling air or thrust remains fixed in substantial parallel relation to the vane, the center of lift does not change, thus the control problem is minimized.

In FIG. 1, the flying platform aircraft 10 according to the present invention is shown in perspective. It has a center body 11 and two smaller side bodies 12 and 13 spaced equidistant laterally from the main body, with a plurality of vanes 14 interposed between the main body and the side bodies. Each vane 14 is provided with a series of ducts 17 along its leading edge perpendicular to its chord line. Each duct 17 is equipped with a series of substantially parallelly directed aft-facing nozzles 18.

For purposes of example, the power plant is shown as an axial flow turbine-type engine 21. It has a forward external compressor 22 which pressurizes secondary air to provide thrust. Air from the compressor 22 is ducted forward through ducts 23 extending the length of the main body 11 on either side. Primary air from the engine is exhausted through exhaust 24. Vane 26, attached to exhaust 24 by vertically oriented hinges 25, may be directed to one side or the other to provide yaw or directional control. From duct 23, the pressurized air is conducted through ducts 30 in each of the vanes 14. Ducts 31 extend forward along the chord line from the ducts 30 to the leading edge of the vane to communicate with ducts 17. Thus air from the external compressor 22 is conducted through duct 23, ducts 30, ducts 31, ducts 17 and out the nozzles 18 in parallel path over the vane surface to provide thrust.

The air from compressor 22 passes around the exterior of engine 21 and is not heated to the extreme temperatures as is the primary or exhausted air. The cool air makes less expensive ducting possible, thus cuts down maintenance problems. In addition to that, the temperatures of the air passing through the vehicle to the ground below will be such that they will not endanger personnel or property.

The primary air which passes through the engine and the exhaust 24 has had most of its power taken from it, leaving a small amount sufficient to provide necessary yaw control forces when the vane 26 is rotated on its hinges 25. It is understood that both primary and secondary air may be ducted to the nozzles 18 to provide additional thrust. The directional and longitudinal control is aided by vertical and horizontal stabilizer elements 32 and 33 on the side bodies 12 and 13. FIG. 1 is shown with body 11 equipped with a transparent canopy 34 in which pilot and passenger may sit. The side bodies are equipped with wheels 35 at their forward end and the main body at its aft end with the wheel 36 for use as landing gear. Wheel 36 is swivel mounted so that the aircraft may be taxied and turned. Fuel tank 37 located in the main body just forward of the engine 21 provides the fuel necessary for operation.

For purposes of example, the side bodies 12 and 13 are fixed in relation to the main body 11 by means of two shafts 41; one at the forward end of the craft and one at the aft end of the craft. The forward shaft 41 extends through the rotational axis of forward vanes 14 and the shaft 41 at the aft end of the craft extends through the rotational axis of aft vanes 14. The center portion shaft 41 is attached to the main body 11 and to the side bodies 12 and 13 by flanges 42. The duct 23 is provided with a flare 43 at each vane. Duct 30 is provided with seals 45 which ride on the flare 43. The opposite end of duct 30 is provided with additional seals 45 about shaft 41. Seals 46 and 47 provide additional seals for the ducting. Bearings 51 and 52 allow the duct 30 and its related vanes 14 to rotate about its axis. Rotational control of each vane element is provided by means of a pulley 53 on the inner end of duct 30 which is turned by cable 54 or 55.

It is obvious that the side bodies 12 and 13 could be of narrow configuration from a structural point of view. However, it is noted that the upper edge of side body 12 is rounded as shown at the area 58. Likewise, the canopy of the main body 11 is rounded as indicated by the area 59. When the pressurized air is jetted from the nozzles 18, the ambient air is pumped toward the trailing edge 62 and about the side body and the main body. Movement of the ambient air past rounded areas 58 and 59 produces a negative pressure providing additional lift for the aircraft.

FIG. 5 shows the mechanism by which the vanes 14 may be rotated about their respective axes. Endless cables 54 and 55 on the right and left sides of the aircraft operate pulleys 53 which are attached to ducts 30 on which the airfoils are mounted. Simultaneous movement of cables 54 and 55 in the same direction will cause equal angular movement of vanes 14. Movement of the cables is effected by stick 90, fulcrumed at pivot 91 and attached to cable 55 at connection 92. Forward movement of the stick 90 will thus cause a like angular forward movement or inclination of the vanes 14. Cable 93 is attached to the lower side of cable 55 at connection 94 and to cable 54 at connection 95 on its upper side and lies around pulleys 96. Forward movement of the stick 90 will cause the connection 95 to move back and connection 94 to move forward resulting in movement of both endless cables 54 and 55 and in the same direction with vanes 14 being simultaneously inclined. A motorcycle-type throttle control for engine 21 as frequently used on helicopters may be mounted on stick 90.

A modified control system (not shown) for angular adjustment of vanes 14 would provide for variation from parallel to a small angular relationship between the vanes during transition between vertical and horizontal. This would involve use of pulleys similar to pulleys 53 on some vanes with a variable radius to that their cross section would be other than circular. One possible pattern of operation would provide for parallel orientation during vertical takeoff, gradual adjustment of all vanes, the front at a faster rate than the rear vanes, so that at some interim point, the front and rear vanes would assume an angular relation to one another, say five degrees, then on to horizontal flight where all would be parallel again. This pattern would be varied to suit the characteristics of the aircraft design.

FIG. 6 shows a system of control for an aircraft according to the present invention. As can be seen from FIG. 2 and FIG. 7, there are valves 71, 72, 73 and 74 located at the front and rear end of the ducts 23 which control air flow to the ducts 30 of vanes 15 and 16. They are biased open against stops 80 by springs 81. The purpose of the vanes 71 and 74 is to slow or stop the flow of air to the nozzles 18 of one or more vanes 15 or 16, thus reducing lift at that vane and producing a moment toward that particular corner or side of the aircraft. Thus if it were desired to pitch the nose of the aircraft down, the forward valves 71 and 72 would be closed or partially closed. Likewise, to create a pitch-up effect, the valves 73 and 74 would be closed. To cause a right bank, the valves 72 and 74 on the right side of the craft would be closed. If it were desired to nose the craft upwardly at the same time that it is banked to the right, then the valves 72, 73 and 74 would be closed in differing amounts to create that result.

The control system for the valves includes control stick 70 and a system of cables and pulleys related in such a manner that movements of stick 70 will produce similar results to those of like movements of a control stick of a conventional aircraft. Cable 75, attached to the lower end of stick 70, moves around pulley 83 and pulley 84 to the arm 79 of valve 71. Likewise, cable 76 moves around its pulleys 83 and 84 to the arm 79 of valve 72, 77 to valve 73 and cable 78 to valve 74. The cables 77 and 78 are attached to the lower end of stick 70 at connection 86. The control stick 70 is fulcrumed in ball joint 85 for movement in any direction. Thus it can be seen that when the stick 70 is pulled straight back to cause a nose-up attitude, the cables 75 and 76 are in effect slackened, leaving the valves 72 and 71 open. The cables 77 and 78 are tensioned, pulling the arms 79 of valves 73 and 74 to close them equally. The lift at the rear of the craft is decreased, allowing it to fall and the nose to come up. Should the control stick 70 be moved to the right to create a right bank, the cables 76 and 78 would be tensioned and the cables 75 and 77 would be slackened, the valves 71 and 73 will remain open and the valves 72 and 74 will be closed an amount relative to the movement amount of the stick. The left bank and nose-up attitude would be created by pulling back and left on the control stick 70. This would close the valve 73, partially close valves 74 and valve 71, leaving valve 72 open. Valve 72, having the greater lift, would cause the right front corner of the craft to nose up creating the pitch up and roll attitude.

An alternate method of control for pitch and roll control is through the use of ailevons 100 attached to the airfoil sections 16 on the aft end of the flying platform aircraft 10. The ailevons 100 may be used alone or in conjunction with the valves 71, 72, 73 and 74. The control system for the ailevons 100 is conventional and not shown here.

Another method of pitch and roll control would involve moving the two aft vanes 14 as ailevons with or without valve coordination by the usual ailevon control system. The advantage would be that only one type of replacement vane would need be stocked for repair in case of damage to the aft vane. The forward vanes could then be adjusted by separate means for trim.

Vane 26 hinged to exhaust 24 is controlled by a rudder pedal, cable and bell-crank system not shown here.

Figure 2:
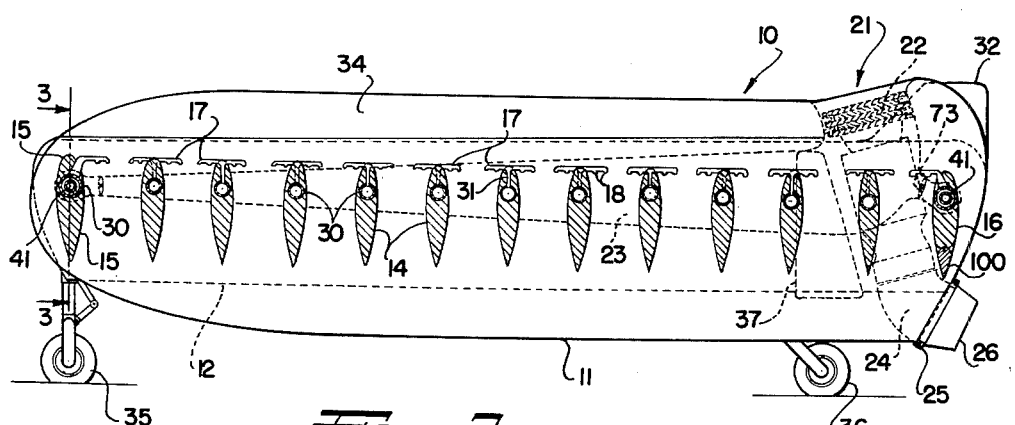
FIG. 2 is a cross section taken on lines 2—2 of FIG. 1.

FIG. 2 shows the flying platform aircraft in a hovering attitude, that is, the airfoil members 14 are in the vertical position. For backward movement, the vanes would be inclined backwardly. For forward movement, the vanes 14 would be tilted forward with their trailing edges aft to create a cascade effect. For this condition of flight, it is desirable that the nose be tilted downwardly slightly.

To illustrate the present invention, the aircraft of FIGS. 1 and 2 has been shown with the 13 vanes on either side. This, of course, may vary depending on the size of the aircraft and its purpose. Each airfoil-shaped vane is shown spaced approximately two-thirds of the length of its chord from the next vane. That is, the chord is one and one-half times the spacing of the vanes. This has been found to produce an optimum condition to utilize the jet augmentation effect. This also provides the necessary clearance for the ducts 17 when the vanes are in their cascade position, as shown in dotted lines in FIG. 4.

The secondary air, the air that is jetted through the nozzles 18, passes around the external jacket of the jet engine 21 and thus is not heated to the temperature that gases which pass through the turbine engine (primary air) attain. The ducting 23, 30, 31 and 17 thus does not need to be of such quality to handle high temperature gases. This reduces the maintenance problem and an additional advantage is gained inasmuch as hot air is not jetted against personnel or objects below the craft. At the same time, the air passing around the jacket of the engine is heated slightly. It has been found that the temperature rise is approximately 10 degrees above that of the ambient air. This provides an automatic anti-icing system. No additional anti-icing system is necessary as is required in the flying platform utilizing rotors or propellers.

Where additional power is needed, the whole of primary and secondary air may be ducted to nozzles 18 for added thrust.

The use of a compressor on the forward end of the engine 21 provides for movement of a large mass of air which will allow use of lower pressures in the range of one and one-half to two times atmospheric to produce the necessary lift and thrust and flight for the present invention.

Because the jet air remains fixed in relation to the airfoil-shaped vane and the vane being provided with means by which it can be rotated about its axis, there is a smooth transition from vertical flight to forward flight without necessity for trimming the change of the center of gravity in relation to the center of lift as has been experienced in prior flying platform type of aircraft because the center of lift remains substantially the same in vertical as well as horizontal flight. The end result is a very stable craft. A minimum of trim movement is required because of the relationship between the jet nozzles and the vanes. Control system requirements are also minimized.

By use of the lift augmentation principle, there is about 60 percent to 80 percent more thrust than developed by conventional jets. In directing the jetted air in a path parallel to the chord of the vane, the thrust may be directed to directly oppose the drag of the aircraft. Because of the low pressures developed, downwash is minimized and the ground erosion problem is reduced.

The engine-out performance of this aircraft is excellent. A rate of descent of approximately 40 feet per minute can be attained with 85 knots air speed. Altitude performance is likewise excellent with a ceiling in excess of 30,000 feet.

Thus it has been shown that a flying platform aircraft according to the present invention can be constructed at a minimum of cost with minimum maintenance problems, which is stable and easily controlled, which is capable of making short takeoffs and landings, vertical takeoffs and landings, which has hover ability, which requires a minimum of training for pilot personnel, which has good control at all speeds and which is adaptable to multiple use.

It is to be understood that certain alterations, modifications and substitutions may be made to the instant disclosure without departing from the spirit and scope of the invention as defined in the appended claims.

What is claimed is:

1. An aircraft having a plurality of longitudinal spaced parallel bodies, a plurality of vanes mounted perpendicularly to said longitudinal bodies and between said bodies, said vanes having a leading edge, a trailing edge and an intermediate thickened area closer to said leading edge than said trailing edge, a rotational axis at said thickened area parallel to said leading edge, means to rotate said vanes about each of their respective axes, nozzle means mounted on said leading edges of said vanes extending into said space between said vanes and directed generally toward said trailing edge of said vanes, means to provide pressurized air to said nozzles.

2. An aircraft having a forward and aft end, a plurality of longitudinal spaced parallel bodies, vertical and horizontal stabilizer elements on some of said longitudinal bodies, vertical vanes laterally mounted between said longitudinal bodies and spaced from one another from said forward end to said aft end of said aircraft, each of said vanes having a leading edge and a trailing edge and a thickened area near said leading edge, said longitudinal bodies and said vanes providing vertical passageways, the upper entrance of each of said passageways being of substantial equal cross-sectional area to the lower exits with an intermediate area near said entrance end having decreased cross-sectional area, a plurality of duct means perpendicularly mounted to said leading edge of said vanes, each of said duct means having a plurality of nozzle means directed toward the exit end of said passageway, means to provide pressurized air to said nozzles.

3. An aircraft having a main body, a plurality of vanes mounted for rotation about lateral axes on either side of said main body, each of said vanes having a leading edge duct means and a trailing edge exposed to atmospheric air, plural first duct means along said leading edge of each vane substantially perpendicular to the chord line of said vane and extending each side of said chord line, plural nozzles in each of said first duct means extending unidirectionally generally toward the trailing edge of each vane, means to move said vanes about each of their respective axes, means to produce pressurized air, second duct means from said means to produce pressurized air to said first duct means so that said pressurized air may be exhausted through said nozzle means.

4. An aircraft having a forward and aft end, a longitudinal central main body and side bodies of substantially equal length, the upper half of said bodies having rounded cross section, said side bodies being spaced laterally equal distances on either side of said main body, plural vanes between said main body and said side bodies, each of said vanes having a leading edge and a trailing edge, each of said vanes having a rotational axis parallel to said leading edge, means to move each of said vanes about its respective axis, duct means at the leading edge of each vane extending perpendicularly to each side of the chord of each vane, each of said duct means having a plurality of nozzles directed generally toward the trailing edge, a source of pressurized air, means to conduct said pressurized air to said duct means so that it is jetted through said nozzles, said vanes on each side of said aft end of said main body having control surfaces hinged to their trailing edges, means to either operate said control surfaces simultaneously or in the same direction or differentially to control pitch and roll of said aircraft.

5. An aircraft having a forward and aft end, a longitudinal central main body and side bodies of substantially equal length, the upper half of said bodies having rounded cross section, said side bodies being spaced laterally equal distances on either side of said main body, plural vanes between said main body and said side bodies, each of said vanes having a leading edge and a trailing edge, each of said vanes having a rotational axis parallel to said leading edge, means to move each of said vanes about its respective axis, duct means at the leading edge of each vane extending perpendicularly to each side of the chord of each vane, each of said duct means having a plurality of nozzles directed generally toward the trailing edge, a source of pressurized air, means to conduct said pressurized air to said duct means so that it is jetted through said nozzles, said vanes on each side of said aft end of said main body having control surfaces hinged to their trailing edges, and means to selectively decrease flow of pressurized air to each of said vanes at said forward end and said aft end, means to either operate said control surfaces simultaneously in the same direction or differentially to control pitch and roll of said aircraft.

6. An aircraft having a forward and aft end, a longitudinal central main body and side bodies of substantially equal length, the upper half of said bodies having rounded cross section, said side bodies being spaced laterally equal distances on either side of said main body, plural vanes between said main body and said side bodies, each of said vanes having a leading edge and a trailing edge, each of said vanes having a rotational axis parallel to said leading edge, means to move each of said vanes about its respective axis, duct means at the leading edge of each vane extending perpendicularly to each side of the chord of each vane, each of said duct means having a plurality of nozzles directed generally toward the trailing edge, a source of pressurized air, means to conduct said pressurized air to said duct means so that it is jetted through said nozzles, means to independently move the vanes on either side of said aft end either simultaneously or differentially to control pitch and roll of said aircraft.

7. An aircraft having a forward and aft end, a longitudinal central main body and side bodies of substantially equal length, the upper half of said bodies having rounded cross section, said side bodies being spaced laterally equal distances on either side of said main body, plural vanes between said main body and said side body, each of said vanes having a leading edge and a trailing edge, each of said vanes having a rotational axis parallel to its leading edge, means to move each of said vanes about its respective axis, duct means at the leading edge of each vane extending perpendicularly to each side of the chord line of each vane, each of said duct means having a plurality of nozzles directed generally toward the trailing edge, a substantially vertically mounted turbine engine having a forward external compressor and an exhaust directed to said aft end of said aircraft, a vertically oriented vane hinged to said exhaust, control means to deflect said vertically oriented vane hinged to said exhaust to aid in directional control, a jacket around said turbine engine and said external compressor, second duct means communicating with said jacket and said first named duct means so that air from said compressor may be jetted through said nozzles.

References Cited in the file of this patent

UNITED STATES PATENTS

| | | |
|---|---|---|
| 1,069,694 | Hayot | Aug. 12, 1913 |
| 2,464,663 | Zing | Mar. 15, 1949 |
| 2,752,109 | Lippisch | June 26, 1956 |
| 2,918,233 | Lippisch | Dec. 22, 1959 |